Oct. 28, 1958
D. W. NORWOOD
2,857,807
ILLUMINATION BALANCE METER FOR COMBINED
SUNLIGHT-FLASHLIGHT PHOTOGRAPHY
Filed Aug. 3, 1953
5 Sheets-Sheet 2
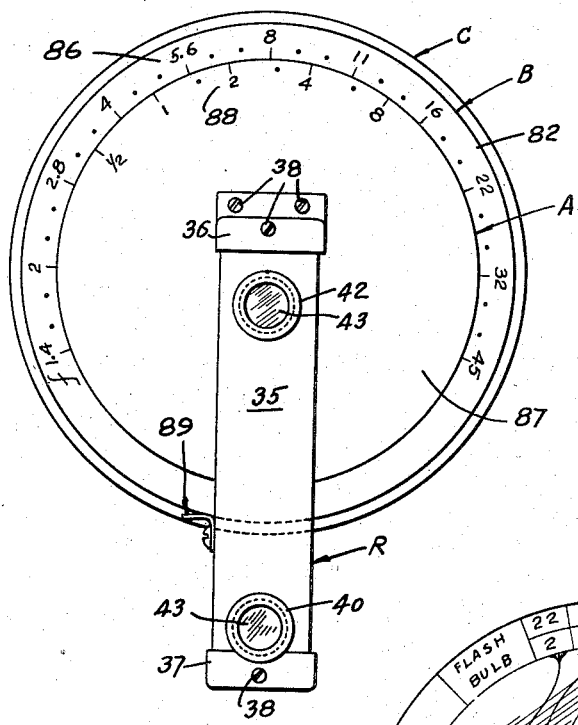
Fig. 5.
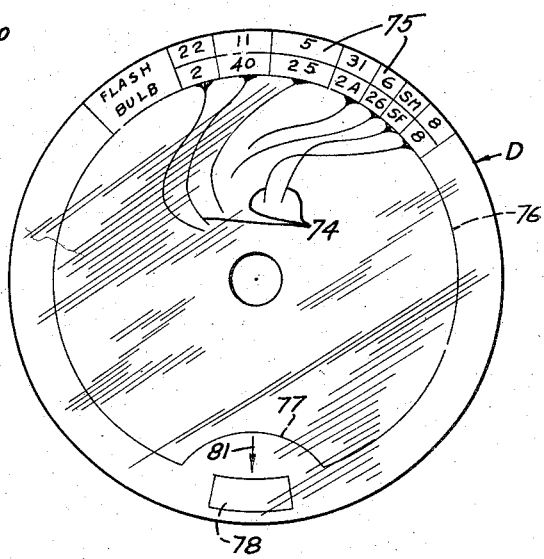
Fig. 7.
Fig. 6.
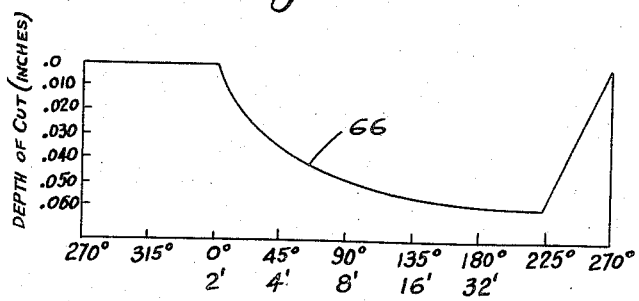
INVENTOR.
Donald W. Norwood.
BY
Knight + Rodgers
ATTORNEYS.

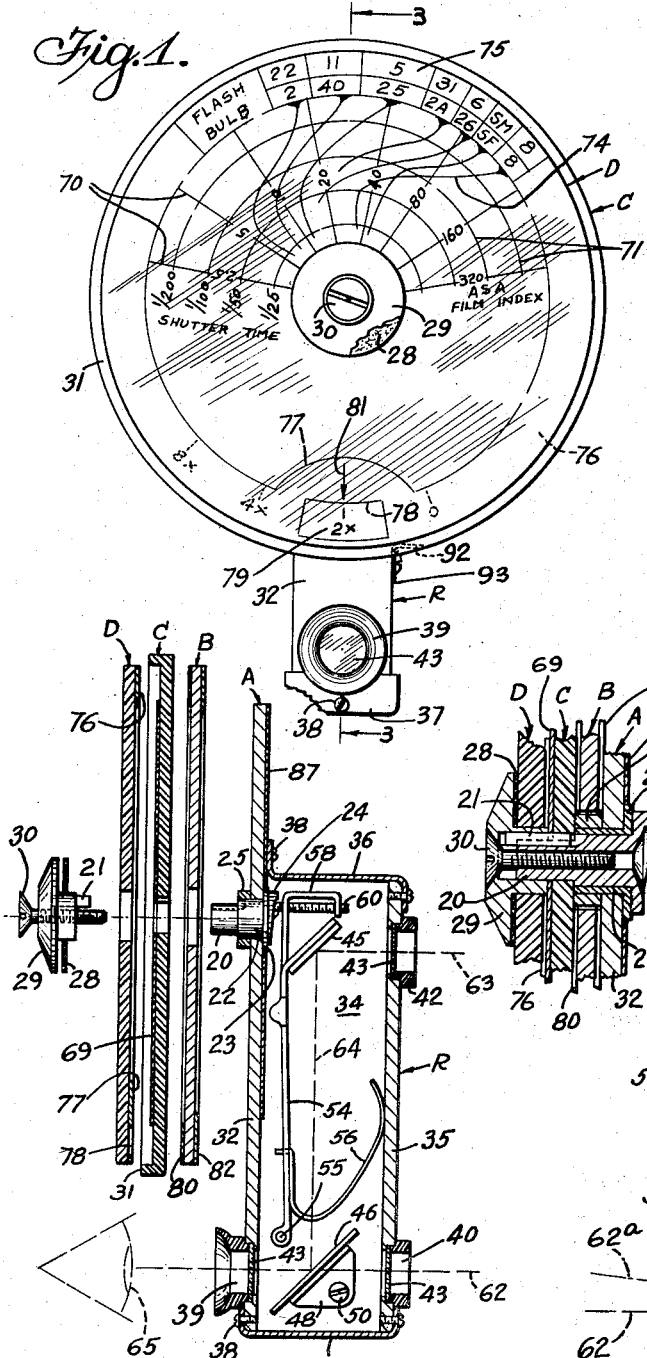

Oct. 28, 1958 D. W. NORWOOD 2,857,807
ILLUMINATION BALANCE METER FOR COMBINED
SUNLIGHT-FLASHLIGHT PHOTOGRAPHY
Filed Aug. 3, 1953 5 Sheets-Sheet 3

INVENTOR.
Donald W. Norwood.
BY Knight & Rodgers
ATTORNEYS.

Oct. 28, 1958  D. W. NORWOOD  2,857,807
ILLUMINATION BALANCE METER FOR COMBINED
SUNLIGHT-FLASHLIGHT PHOTOGRAPHY
Filed Aug. 3, 1953  5 Sheets-Sheet 4
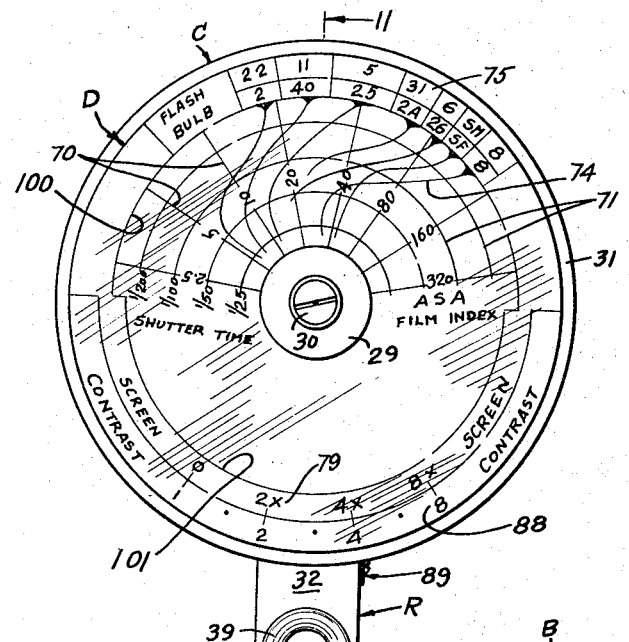
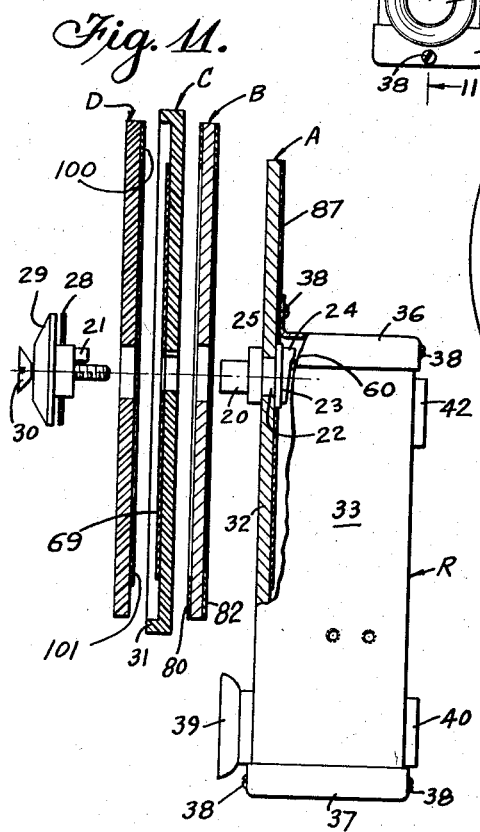
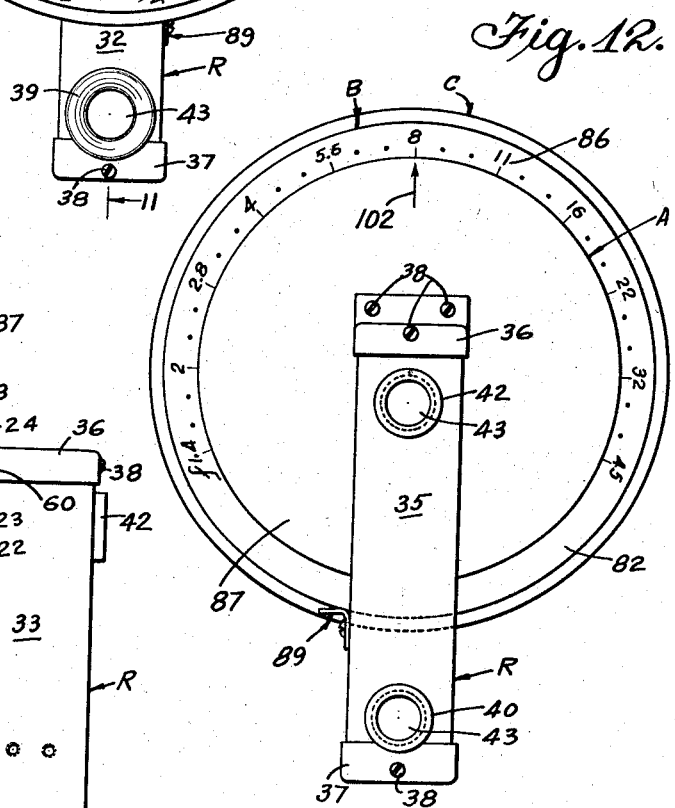
INVENTOR.
Donald W. Norwood.
BY
Knight & Rodgers
ATTORNEYS.

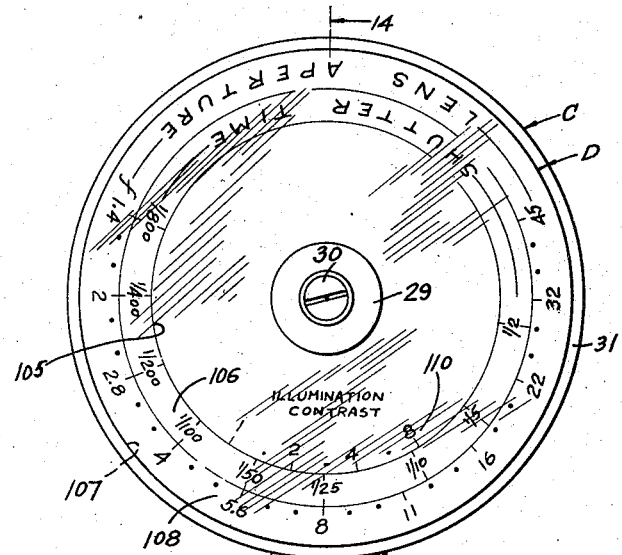

United States Patent Office 2,857,807
Patented Oct. 28, 1958

2,857,807

ILLUMINATION BALANCE METER FOR COMBINED SUNLIGHT-FLASHLIGHT PHOTOGRAPHY

Donald W. Norwood, Pasadena, Calif.

Application August 3, 1953, Serial No. 371,825

13 Claims. (Cl. 88—2.4)

This invention relates to devices for flashlight photography with special reference to photography in which a flashlight source is used as secondary illumination to supplement illumination from a primary source. The primary illumination may be direct sunlight, indirect sunlight or artificial illumination. In such photography, the desired ratio between the intensity of illumination of the subject by the primary light source and the intensity of illumination of the subject by the secondary light source will depend on the effect sought by the photographer. In most instances, the secondary light source is used merely to fill in the shadow areas created by the primary light source and accordingly the ratio of intensity of illumination by the primary source to the intensity of illumination by the secondary source will usually be in the range of 4:1 and 2:1. In some instances, however, the desired ratio may be as high as 8:1 or higher where exceptionally high contrast is desired for dramatic effect or for special emphasis on some particular part of the subject. In other instances, the ratio may be as low as 1:1 where uniform lighting is desired or may be even lower to make the flash the primary light source so that a foreground object will stand out sharply.

With the intensity of the illumination of the subject by the primary source at some given value, which value may either be estimated or be measured by a light meter, the remaining factors to be considered may be enumerated as follows:

(1) Distance of the flashlight source from the subject being photographed, i. e., the distance factor.

(2) Effective light developed by the flash. This may be called the flashlight factor or simply the flash factor.

(3) Duration of shutter opening. This duration may be called the shutter time factor.

(4) Speed rating or relative sensitivity of the film. This speed rating may be called the film sensitivity factor.

(5) Diameter of the camera aperture relative to the focal length of the lens. This may be called the aperture factor.

(6) Desired ratio of intensity of illumination of the subject by the primary source to intensity of illumination of the subject by the secondary flash source. This may be called the contrast factor.

(7) Effectiveness of any reducing screen that may be used to subdue or diffuse the illumination from the flash source. This may be called the screen factor.

In approaching the problem of making a correct exposure, the photographer first selects a combination of lens aperture adjustment and shutter time adjustment appropriate for the intensity of the primary illumination and the type of film in the camera. Usually he refers to a light meter for this information. The present invention is next used, the general object of the invention being to provide a compact, convenient and accurate device to enable the photographer to solve the illumination balance problem in a simple and expeditious manner for any assumed combination of aperture and shutter time adjustment.

With a given type of film, a given source of flash illumination, and given aperture and shutter time adjustments, the photographer has a range of choice with respect to each of three different final factors in the exposure problem, namely, the contrast factor, the screen factor, and the distance factor. He may vary these three factors at will, but selecting values for any two will determine the value of the third factor. A more specific object of the invention, in this regard, is to provide a device which will permit the photographer to select values for any two of the three final factors and on the basis of such selection, quickly and simply arrive at the value of the third factor without need for any mental calculation whatsoever. The photographer may find the contrast in the ultimate image that will result from using a given reducing screen with the selected flash source at a given distance from the subject; or with a given contrast to be sought in the final image and with the selected flashlight source at a given distance from the subject, he may determine what reducing screen should be used to subdue the illumination from the flashlight; or with a given screen (or no screen) he may determine at what distance to place the flashlight source from the subject to result in a given contrast in the ultimate image.

A feature of the invention is that it will not only determine the effects that will result from different choices with respect to these three factors, namely, the contrast factor, the screen factor and the distance factor, but will also indicate the result of substituting one flash source for another or of substituting one type of film for another or of changing either the aperture factor or the shutter time factor.

The objects of the invention are attained by four relatively movable scale members in combination with a range finder mechanism having a fixed range finding element and a second movable range finding element. Two of the four scale members are connected respectively to the two range finding elements so that the relative positions of these two scale members will vary with the distance setting of the range finder mechanism. A third scale member is connected in a releasable manner to one of the two scale members to form a first cooperating pair of scale members, and the fourth scale member is connected in a releasable manner to the other of the two scale members to form a second cooperating pair of scale members. The third and fourth scale members are also provided with cooperating indices including a scale on at least one of these members representing one of the factors involved.

In such a combination, the distance factor is, of course, represented by the relative positions of the two scale members that are connected respectively with the two range finding elements. The remaining six factors with the screen factor included, or the remaining five factors with the screen factor omitted, are represented by indices or scales on the four scale members, there being one or two scales on each scale member.

The relative movement among the four scale members may be either linear or rotary. In the preferred practice of the invention, the relative movement is rotary and the four scale members comprise a base scale member and three concentric circular scale members rotatably mounted thereon. A feature of the invention is the concept of combining the base scale member with the fixed range finding element of the range finder mechanism, and of incorporating the base scale member in a base structure that includes the range finder housing and serves as a convenient handle for the device as a whole.

The two members of each of the two cooperating pairs of scale members may be interconnected frictionally so that one may be manually rotated to various settings relative to the other, but whatever setting is selected will be maintained when the range finder is operated to vary the relation between the two pairs of scale members. If desired, however, latch means may be used to releasably interconnect the two scale members of each cooperating pair.

In those practices of the invention in which flash bulbs of the combustion type are used as distinguished from flash tubes of the electronic type, an important object is to attain certain advantages including the elimination of one scale, by combining the shutter factor with two other factors. This object is accomplished by combining the shutter time factor with the flash factor and with the film sensitivity factor. Thus one of the scales, instead of representing simply the flash factor, represents the flash factor as limited by the shutter time factor in all instances where the flash factor is so limited; and instead of a scale that represents the film factor only, a scale is used that represents the film factor combined with the shutter time factor.

In practice the two scales involving the shutter time factor are what may be termed two-dimensional scales. One of the four scale members has a scale with two dimensions representing the shutter time factor and the flash factor, respectively, and for cooperation therewith another of the four scale members has a scale with two dimensions representing the shutter time factor and the film sensitivity factor, respectively. In the preferred practices of the invention wherein the two scale members are rotary members, the two dimensional scales are polar grid scales, that is, scales whose values are plotted according to polar coordinates.

A further specific object in the practice of the invention with combustion type flash bulbs is to provide an arrangement of two overlapping scale members which will make it possible to adjust the two members relative to each other for correlation of two-dimensional scale values on one of the members with two-dimensional scale values on the other. A feature of the invention is the concept of attaining this object by placing the two scales on overlapping portions of the two members with the uppermost of the two portions transparent so that both of the two-dimensional scales will be visible simultaneously for guidance in the setting of the two members in accord with given values on the two two-dimensional scales.

In the practices of the invention using electronic type flash sources, no screen will ordinarily be used to subdue the flash illumination and therefore the screen factor is omitted. Moreover, the time duration of an electronic flash is so much shorter than the minimum exposure period of any conventional camera that no two-dimensional scales are necessary. For these reasons, the embodiment of the invention for use with electronic flash sources may be simplified with respect to the scales and indices employed thereon, as will be shown.

The various features, objects, and advantages of the invention will be apparent in the following detailed description considered with the accompanying drawings.

In the drawings, which are to be regarded as merely illustrative:

Fig. 1 is a face view of a selected embodiment of the invention;

Fig. 2 is a side elevation of the same embodiment;

Fig. 3 is a cross-sectional view taken along the line 3—3 of Fig. 1;

Fig. 4 is a partly diagrammatic fragmentary view similar to Fig. 3 showing an enlarged detail of the range finder mechanism;

Fig. 5 is a rear view of the same embodiment;

Fig. 6 is a diagram showing graphically the shape of a cam surface used in the operation of the device;

Fig. 7 is a face view of the front or outermost rotary scale member of the device shown in Fig. 1;

Fig. 10 is a face view of a second embodiment of the invention;

Fig. 11 is a cross-sectional view taken along the line 11—11 of Fig. 10;

Fig. 12 is a rear view of the device shown in Fig. 10;

Fig. 13 is a face view of a third embodiment of the invention adapted especially for use with electronic flash sources;

Fig. 14 is a cross-sectional view taken along the line 14—14 of Fig. 13; and

Fig. 15 is a rear view of the device shown in Fig. 13.

Figure 8:
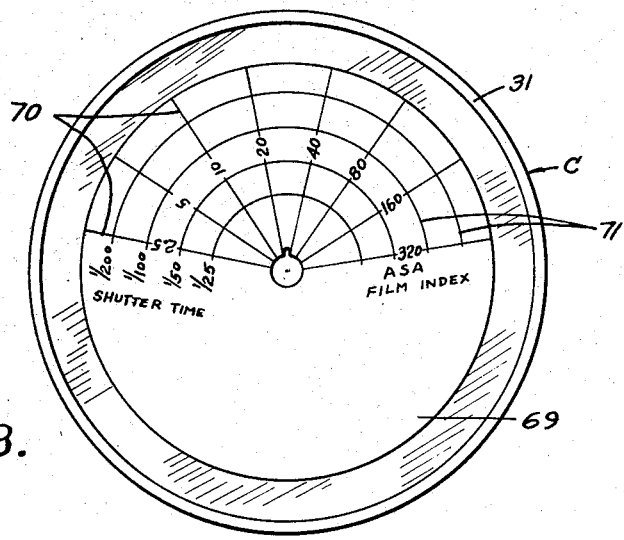
Fig. 8 is a face view of the rotary scale member underlying the scale member shown in Fig. 7.

The first embodiment of the invention shown in Figs. 1 to 9 includes four scale members comprising a base scale member A and three rotary disk-shaped scale members B, C and D, mounted concentrically thereon by means of a spindle 20. Scale members B and D are freely rotatable on the spindle 20, but scale member C is keyed to the spindle by means of a spline 21. It is contemplated that the scale member C will be used as manual means for rotation of the spindle 20 and for this reason the scale member C is of larger diameter than the scale members adjacent thereto.

The spindle is journaled in a flanged bearing sleeve 22 carried by the base member A and is enlarged at its inner end for forming a radial shoulder 23 and a cylindrical cam member 24. A ring member 25 is mounted on the bearing sleeve 22 to serve as a journal for the scale member B that lies adjacent the base scale member A. Telescoped onto the outer end of the spindle 20 is a hub member 29 secured by a screw 30, which hub member serves as a journal for the front or outermost scale member D. In the construction shown, the hub member 25 is slotted for engagement by the spline 21 to rotate with the spindle 20. Preferably a friction member such as a felt washer 28 is bonded to the inner face of the hub member for frictional contact with scale member D to cause scale member D to tend to rotate with scale member C and yet permit scale member D to be adjusted relative to scale member C.

The base member A is unitary with a range finder mechanism R and it is contemplated that the spindle 20 will be controlled by rotation of the scale member C relative to the base scale member to effect distance-measuring adjustment of the range finder mechanism. It is further contemplated that the scale member B will normally be releasably connected with the base scale member A for adjustment relative thereto to form what may be termed a first pair of cooperating scale members and that the front or outermost scale member D will likewise normally be releasably connected to the scale member C for adjustment relative thereto to form a second cooperating pair of scale members. Thus when the actuating scale member C is rotated to different positions representing different distance settings of the range finder mechanism, the outermost or front scale member D will rotate therewith and the scale member B adjacent the stationary base scale member A will remain stationary. This arrangement makes it possible to follow a procedure in which the scale member B is rotated to an appropriate setting with respect to the fixed base scale member and the front scale member D is rotated to an appropriate setting with respect to the scale member C and then, as a final step, the scale member C is rotated to a position determined by the range finder mechanism, the scale member D rotating with the scale member C to result in positioning all four of the scale members relative to each other for the solution of the given exposure problem.

In the particular construction shown in the drawings, the base scale member A is a flat plate; the scale member B is a flat disk; the scale member C is a disk with a circumferential flange 31; and the front or outer scale member D is a flat disk dimensioned to fit into the circular seat formed by the circumferential flange 31. The two inner scale members A and B may be of opaque material, but in the present embodiment of the invention, it is contemplated that at least portions of the two outer scale members C and D will be transparent with an extensive transparent area of scale member D overlying scale member C.

Preferably the housing of the range finder mechanism R has a front wall 32 integral with the base scale member A, two side walls 33 and 34 and a rear wall 35, these four walls being integral parts of a one-piece shell. The shell may be made of metal but preferably is molded of suitable plastic material. A flanged wall member 36 closes the top of the shell and a second flanged wall member 37 closes the bottom, these two flanged wall members being secured to the shell by screws 38.

The range finder mechanism R has two axially aligned sighting windows 39 and 40 and a third sighting window 42, each of the three sighting windows being closed by a transparent disk 43. The range finder mechanism may be of a familiar type that employs a first movable range finding element in the form of a mirror 45 opposite the sighting window 42 and a second fixed range finding element in the form of a mirror 46 intersecting the common axis of the two windows 39 and 40. The fixed mirror 46 is capable both of reflecting light and of transmitting light, the mirror being made of transparent material and having a partially silvered surface for this purpose. In the construction shown, the mirror 46 is mounted on a bracket 48 and the bracket, in turn, is mounted on the range finder housing by a suitable screw 50. If necessary, the screw 50 may be loosened temporarily for adjusting the angular position of the mirror.

The mirror 45 is carried by an arm 54 that is rotatably mounted on a pivot pin 55 inside the range finder housing. A suitable leaf spring 56 in stress between the arm 54 and the housing continuously urges the arm in counterclockwise direction as viewed in Fig. 3. The upper end of the arm 54 is U-shaped as indicated at 58 and carries a suitable adjustment screw 60, the end of which is in cooperating contact with the previously mentioned cam member 24 on the inner end of the spindle 20. By virtue of the leaf spring 56, the arm 54 accurately responds to rotation of the cam member 24 and the adjustment screw permits adjustment of the arm relative to the cam member for the purpose of calibrating the range finder. The cam member 24 is shaped to cause clockwise rotation of the arm 54, as indicated by dotted lines in Fig. 4, in response to clockwise rotation of the actuating scale member C as the scale member is viewed in Fig. 1.

The mode of operation of such a range finder mechanism is well known in the art. With the movable parts positioned as shown in Fig. 3, the line of sight or ray of light indicated by the dotted line 62 and the second line of sight or ray of light 63 are nearly parallel since they meet at an object at a relatively great distance from the range finder. When the mirror 45 is at the angle corresponding to the distance to a particular object, the ray 63 is reflected along the line 64 and again reflected along the line 62 so that the object appears as a single image at the eye position 65. If the range finder mechanism is not in adjustment for the particular object represented by the lines 62 and 63, the operator will see two images. For example, if an operator looks at an object closer than the distance adjustment of the range finder, the ray of light from the nearer object indicated by the line 63a in Fig. 4 will be reflected along the line 64a and along the line 62a to produce a double image as viewed by the operator.

The rotation of the scale member C is a function of the distances measured by the range finder mechanism and preferably the shape of the cam member 24 is such that the distance values represented by rotation of the scale member C vary geometrically, with successively doubled values equally spaced apart. Preferably the distance values double within each 45 degrees of rotation of the scale member C.

Fig. 6 shows diagrammatically and numerally how the cam member 24 may be shaped to produce the desired distance scale extending over approximately 180 degrees of rotation of the scale member C. The abscissas represent angular movement or position of the cam member in degrees (upper scale) and corresponding range distances in feet (lower scale). The ordinates represent depth of cut of the cam surface facing the screw 60. The cam surface, represented by the curve 66, recedes most rapidly at the shorter range values, and recedes relatively slightly at the greater range values. It will be noted that between the zero degree point and the 45 degree point of rotation of the scale member C and cam member 24, the corresponding distance computed by the range finder mechanism doubles from 2 feet to 4 feet and doubles successively for each additional 45 degrees of rotation to the final distance value of 32 feet at 180 degrees of rotation of the scale member.

It is apparent that since the mirror 46 is fixed relative to the range finder housing, and since the base scale member A is integral with the range finder housing, the base scale member is in effect connected with the mirror 46 to provide a constant relationship between the two. It is further apparent that since the mirror 45 tilts in response to rotation of the scale member C, the scale member C is operatively connected with the mirror 45. Thus the scale member C is operatively connected to the movable range finder element 45 to move the latter in response to movement of the scale member C, and the base scale member A is disposed in fixed relation to the fixed range finder element 46, so that position of the scale member C relative to the fixed scale member A always corresponds to the adjustment of the range finder mechanism.

In this first embodiment of the invention, the front side of the scale member C has a circular facing sheet 69 of less diameter than the scale member and this facing sheet is provided with a two-dimensional scale in the form of a polar grid scale. As shown in Fig. 8, the polar grid scale has a plurality of spaced radial grid lines 70 and a plurality of radially spaced concentric grid lines 71. The radial grid lines 70 represent the film sensitivity factor and are marked in terms of the conventional A. S. A. ratings of film speed or sensitivity, from 2.5 to 320 A. S. A. The concentric arcuate grid lines 71 represent values of the shutter time factor and are marked for four speeds from $\frac{1}{25}$ second to $\frac{1}{200}$ second, each successive grid mark reducing the shutter time by half. Since the front scale member D is transparent, this two-dimensional scale for the film sensitivity factor and the shutter time factor is conveniently visible therethrough for guidance in setting the front scale member D relative to the scale member C.

For cooperation with the described two-dimensional scale on the scale member C, the transparent front scale member D carries a coacting two-dimensional scale which also involves the shutter time factor. Since the concentric shutter time factor values are the same on both scales, and since the two dimensional scale on the scale member C is visible through the front scale member D, concentric grid lines corresponding to the concentric grid lines 71 are omitted on the front scale member D but, of course, they may be added if desired. On the front two-dimensional polar grid scale, as best shown in Fig. 7, a series of lines 74 represent the flash factor as limited or modified by the shutter time factor. These lines represent different flash sources, as may be understood by inspecting the marginal series of numbers 75 on the scale member D identifying various flash bulbs. It will be noted that the modified flash factor lines 74 are of broken or curved configuration and in nearly all instances change direction between points of intersection with the successive concentric shutter factor grid lines 71. It is to be noted, moreover, that in each instance the change in direction is toward radial alignment with respect to the axis of rotation of the scale member rather than away from such radial alinement, and some of the lines actually terminate in such radial alinement.

The significance of the modified flash factor lines 74 with respect to their distribution and changes in direction may be understood by considering the characteristics of different flash sources. Each line represents the relationship between the shutter time, plotted radially, and the effective illumination value of the corresponding flash-light source, that is, the total illumination produced by the flash source during the different shutter time intervals, plotted circumferentially. Some flash sources start very rapidly. Others start slowly but later rise rapidly to a peak of intensity and then fall off rapidly. Some have a relatively flat illumination-level curve over a relatively long period. Some have an extremely short period of very intense illumination. As shown by the tabulation of numbers 75 in Fig. 7, the commonly used flashlight bulbs fall into groups with respect to their total illumination output and with respect to the shape of their time-intensity curves.

Each of the lines 74 intersects the concentric shutter factor grid for 1/200 second at a point which corresponds to the portion of the total quantity of light generated by a flash bulb of the given type that reaches the film within the limited time period of 1/200 second. In most instances the shutter factor of 1/200 second is a limiting factor because most flash bulbs provide illumination for a longer period than 1/200 second. The fact that 1/200 second is a limiting factor in most instances is indicated by the non-radial direction of the lines 74 between the 1/200 second grid and the 1/100 second grid line as may be seen in Fig. 1. 1/100 second is also a limiting factor in most instances as indicated by the fact that most of the lines 74 are also non-radial in direction between the 1/100 second grid line and the 1/50 second grid line. In some instances, the 1/50 second shutter factor is not limiting, as shown by the fact that the line 74 that represents S. M. and S. F. flash bulbs, extends inward in a true radial direction from the 1/50 second grid to the 1/25 second grid.

The series of numbers 75 may be printed on a ring shaped sheet 76 of suitable material that is bonded to the rear face of the transparent scale member D and the lines 74 may be printed or etched on the back surface of the scale member. The ring shaped sheet 76 preferably has a portion 77 of enlarged width in which is cut a small window 78. The window 78 lies outside the diameter of the facing sheet 69 on the scale member C and since both scale members C and D are made of transparent material, the window 78 makes it possible to view therethrough a screen factor sacle 79 on the scale member B.

Figure 9:
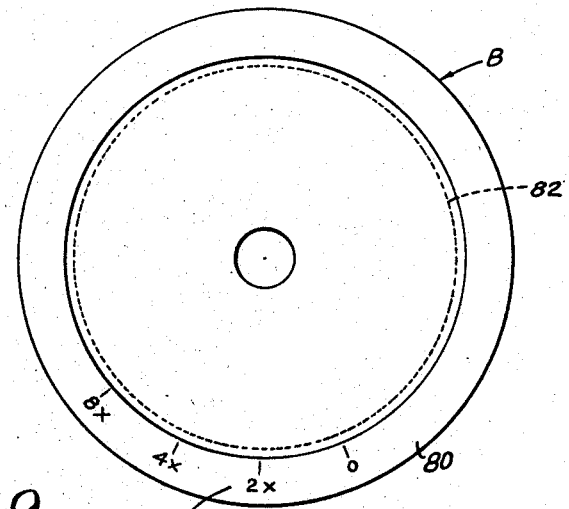
Fig. 9 is a face view of the rotary scale member that underlies the scale member shown in Fig. 8.

As best shown in Fig. 9, this screen factor scale 79, which is printed on a ring shaped facing sheet 80, represents the different degrees of effectiveness of different screens that may be used to reduce the illumination from the flash source. Thus, 2x represents a screen which reduces the illumination by half, and 4x represents a screen which will reduce the illumination 75% to one-fourth of the full illumination. As may be seen in Fig. 1, the front scale member D carries a reference or index 81 in the form of an arrow printed on the ring shaped sheet 76 adjacent the window 78, the purpose of this arrow being to indicate values on the screen factor scale 79 in the solution of exposure problems.

As indicated in Fig. 3, the scale member B, in addition to the front ring-shaped facing sheet 80, has a similar facing sheet 82 on its rear surface and the base scale member A is sufficiently smaller in diameter than the scale member B to expose this second facing sheet at the rear of the device. As may be seen in Fig. 5, this second facing sheet 82 carries an aperture factor scale 86 comprising a plurality of spaced graduations or marks representing different aperture sizes or f. stops. Here again, a geometrical scale is used in which the values double over equal distances along the scale. Thus f. 22, which represents twice the aperture area of f. 32, is spaced 22½ degrees from f. 32 and f. 16, f. 11, etc. are spaced apart by the same distance.

Mounted on the back face of the base scale member A is a circular facing sheet 87 which, as may be seen in Fig. 5, carries a contrast factor scale 88. On this scale numeral 2, for example, represents a ratio of 2:1 between the intensity of illumination of the subject by the primary light source and the intensity of the illumination of the subject by the secondary flash source. It will be noted in Fig. 5 that the aperture factor scale 86 on the scale member B is positioned for cooperation with the contrast factor scale 88 on the base scale member A so that either the aperture setting for any given contrast or the contrast for any given aperture setting, may be seen at a glance.

As heretofore stated, it is contemplated that the scale member B will be releasably connected with the base scale member A to remain at a fixed setting with respect to base scale member when the scale member C is rotated for different adjustments of the range finder mechanism R. Frictional contact of the scale member B with the base scale member A may suffice for this purpose, but I prefer to provide a mechanical latch means to releasably hold the scale member B against rotation. As shown in Figs. 1 and 2, the releasable latch means may comprise a resilient metal member 89, having a flange 90 to receive screws 91 for attachment to the side of the range finder. The resilient metal member 89 has an integral latch arm 92 that yieldingly engages the periphery of the scale member B, this latch arm having a flange 93 that rests slidingly against the side of the range finder. Light downward finger pressure against the latch arm 92 is sufficient to release the scale member B momentarily for setting relative to the base scale member A. Such a latch means is not required to cause the outer scale member D to rotate with the scale member C, since the scale member D seats into the scale member C with a frictional fit that causes the two to rotate together and yet permits manual adjustment of the outer scale member D relative to the scale member C.

The manner in which this first embodiment serves its purpose may be readily understood from the foregoing description. Before using the device to solve an exposure problem, the photographer measures or estimates the intensity of the illumination of the subject by the primary light source and selects an appropriate combination of aperture setting and shutter time setting for this illumination intensity. With these values assumed, the photographer momentarily releases the latch 89 to set the scale member C relative to the base scale member to position the selected aperture value on the scale 86 opposite the desired contrast ratio on the scale 88. The particular setting of the scale member C relative to the base scale member A that is shown in Fig. 5 may result, for example, from a decision to use an aperture setting of f. 9, and to seek a contrast ratio of 4:1.

The next step is to set the outer scale member D relative to the scale member C in accord with the sensitivity of the film in the camera, the elected camera shutter adjustment and the flash bulb that is to be used. The photographer has in mind the A. S. A. rating for the sensitivity of the film in his camera, and looking through the transparent outer scale member D at the two-dimensional scale on the scale member C, he notes where the radial grid line 70 corresponding to the film sensitivity factor intersects the concentric grid line 71 corresponding to the elected camera shutter speed. The photographer then rotates the outer scale member D relative to the scale member C to cause the line 74 representing the flash bulb to register with the selected intersection point on scale member C. The particular setting of the outer scale member D relative to the scale member C that is shown in Fig. 1, for example, may be the result of electing to use a number 5 flashbulb with film having an A. S. A. rating of 20 and with the camera shutter adjusted for an exposure of 1/100 second.

The first two steps just described have resulted, first, in setting the scale member B relative to the base scale member A and, second, in setting the outer scale member D relative to the scale member C. The photographer now stands at a location selected for firing the flash bulb and looks through the sighting window 39 of the range finder mechanism at the subject to be photographed and manually rotates the scale member C to adjust the movable range finder element 45 until the subject appears as a single image. During this distance-measuring adjustment of the range finder mechanism, the scale members C and D rotate together relative to the scale members A and B. With this adjustment of the range finder mechanism, the distance factor has been introduced and the index mark 81 on the outermost scale member will cooperate with the screen factor scale 79 on the scale member B to indicate the particular screen required to subdue the illumination from the flash bulb sufficiently to obtain the desired contrst ratio of 4:1. In Fig. 1, for example, the index 81, cooperating with the screen factor scale 79, discloses that a 2x screen should be used.

In the foregoing example, a given contrast factor and a given distance factor are assumed and the answer is found in terms of the required screen factor. If desired, however, values for the screen factor and for the distance factor may be assumed for the purpose of finding the answer in terms of the contrast factor. Thus, with the range finder mechanism adjusted for the selected distance, the outer scale member D may be rotated to place the index 81 at the desired value on the screen factor scale 79 and the answer will be found on the back of the device where the resulting contrast ratio on the scale 88 will be found in register with the elected aperture setting.

In a third procedure that may be followed with this first embodiment of the invention, the value of the screen factor and the value of the contrast factor are selected and the device is used to determine the answer in terms of the required distance for the flash source from the subject. In such a procedure, scale member B is adjusted relative to scale member A to place the selected value on the aperture scale 86 opposite the selected value on the contrast scale 88; the front scale member D is adjusted relative to scale member C in accord with the values of the film sensitivity factor, the shutter time factor, and the flash factor; and then, with the four scale members correctly adjusted relative to each other, the photographer will look at the subject through the range finder window 39 and walk toward or away from the subject to find the distance for which the range finder mechanism is set, i. e., to find the distance at which the images in the range finder merge into one image.

It is apparent also that the device makes it possible for the photographer to explore the possibilities of substituting one flash source for another. He may also ascertain whether or not changing to a different type of film would be advantageous.

The second embodiment of the invention shown in Figs. 10, 11 and 12, is largely identical in physical structure to the first described embodiment of the invention as indicated by the use of corresponding numerals to indicate corresponding parts. This second embodiment differs from the first embodiment only in the distribution of the various scales and indices among the four scale members.

Mounted on the back of the front transparent scale member D is a facing sheet having two half circle portions. One relatively wide half circle portion 100 extends to the peripheral edge of the scale member and carries the numerals 75 representing the different types of flash bulbs; the other half circle portion 101, which is narrower and is spaced radially inward from the periphery of the scale member, carries the screen factor scale 79. The series of irregular lines 74 representing the flash factor as limited or modified by the shutter time factor are etched or printed on the back surface of the front scale member D. The facing sheet 69 on the scale member C carries the two-dimensional polar grid scale having radial grid lines 70 representing the film sensitivity factor, and concentric lines 71 representing the shutter time factor. The ring shaped facing sheet 80 on the front surface of the scale member B carries the contrast factor scale 88 which, as shown in Fig. 1, is positioned to cooperate with the screen factor scale 79 on the front scale member D. As may be seen in Fig. 12, the aperture factor scale 86 is on the ring shaped facing sheet 82 on the back of the scale member B and, finally, a reference mark or index 102 is printed on the facing sheet 87 on the back of the base scale member A for cooperation with the aperture factor scale 86.

It is apparent that this second embodiment of the invention operates in much the same manner as the first described embodiment. In a typical procedure, for example, with the aperture values and shutter time values selected in accord with the intensity of illumination by the primary light source, the first step may be to adjust the scale member B relative to the base scale member A to position the selected value on the aperture scale 86 in registry with the index 102. Thus, in Fig. 12, the value f. 8 is shown at the index 102. The next step may be to adjust the front scale member D relative to the scale member C in the manner heretofore described in accord with the selected values of the flash factor, the film sensitivity factor, and the shutter time factor. The photographer may then stand at the position desired for the flash source and look at the subject through the range finder window 39 and rotate scale member C to adjust the range finder mechanism in accord with the distance to the subject. This adjustment of the range finder mechanism will cause the front two scale members D and C to rotate in unison to bring all four of the scale members into correct relation with each other in accord with the factors of the exposure problem. The photographer may then look at the front of the device to ascertain from the relative positions of the scales 79 and 88 what screen should be used to provide the desired contrast or, conversely, what contrast will result from the use of a selected screen. It will be noted that in this second embodiment of the invention, the single index mark 102 is used with reference to the aperture scale 86, whereas in the first described form of the invention, the single index is used with reference to the screen factor scale 79. In other practices of the invention, as pointed out hereinafter, the single index or reference mark may be used with reference to the contrast factor scale.

It will be apparent to those skilled in the art that the various factor scales may be distributed among the four scale members in various other ways. Other arrangements that may be used are, for example:

(1) The base scale member A carries the aperture factor scale; scale member B carries the contrast factor scale and the screen factor scale; scale member C carries the two-dimensional scale representing the flash factor as limited by the shutter time factor; and scale member D carries the two-dimensional scale representing the film sensitivity factory in combination with the shutter time factor and also carries an index mark for reference to the screen factor scale on scale member B.

(2) The base scale member A carries the aperture factor scale; the scale member B carries the contrast factor scale and also carries an index for reference to a screen factor scale on scale member D; scale member C carries the two-dimensional scale combining the flash factor and the shutter time factor; and the front scale member D carries the two-dimensional scale combining the film sensitivity factor and the shutter factor and also carries the screen factor scale.

(3) The base scale member A carries the aperture factor scale; the scale member B carries the screen factor scale and also carries an index for reference to the aperture factor scale on the base scale member; the scale member C carries the two-dimensional scale combining the flash factor with the shutter time factor; and the outer scale member D carries the two-dimensional scale representing the film sensitivity factor combined with the shutter time factor and also carries the contrast factor scale.

(4) The base scale member A carries the screen factor scale; the scale member B carries the aperture factor scale and the contrast factor scale; the scale member C carries the two-dimensional scale combining the flash factor with the shutter time factor; and the outer scale member D carries the two-dimensional scale representing the film sensitivity factor combined with the shutter time factor and also carries an index mark for reference to the contrast factor scale on scale member B.

(5) The base scale member A carries the screen factor scale; scale member B carries the aperture factor scale and an index mark for reference to a contrast scale on scale member D; scale member C carries the two-dimensional scale representing the flash factor combined with the shutter time factor; and the outer scale member D carries the two-dimensional scale combining the film sensitivity factor with the shutter time factor and also carries the contrast factor scale.

The third embodiment of the invention shown in Figs. 13, 14 and 15 is also largely identical with the first described embodiment of the invention as indicated by the use of corresponding numerals to indicate corresponding parts. This embodiment of the invention, however, is especially adapted for use with electronic flash devices as distinguished from use with flash bulbs that produce light by combustion. In the field of conventional photography, the effective illumination produced by an electronic flash device is independent of the shutter time, since the duration of the flash is less than the shortest shutter time within the range of shutter adjustment ordinarily used. It is not necessary, therefore, to use two-dimensional scales to combine the shutter time factor with the flash factor and with the film sensitivity factor.

In this third embodiment of the invention, the outermost scale member D, which is made of transparent material, has a narrow ring shaped facing sheet 105 on its rear face and on the front of this facing sheet is printed a shutter time factor scale 106, as may be seen in Fig. 1. On the front of the next scale member C, is a ring shaped facing sheet 107 of larger diameter on which is printed an aperture factor scale 108 as also may be seen in Fig. 1. Both scale members D and C are made of transparent material to make visible therethrough a circular facing sheet 109 on scale member B, which facing sheet carries a contrast factor scale 110 which may be read with reference to the shutter time factor scale 106. On the back side of the scale member B is a ring shaped facing sheet 111 which, as shown in Fig. 15, carries a film sensitivity scale 112. Finally, on the back of the base scale member A is a facing sheet 113 which, as shown in Fig. 15, carries a flash factor scale 114. The flash factor scale 114 represents the illumination rating of various electronic flash devices.

The manner in which this third embodiment of the invention is utilized may be readily understood from the previous descriptions. With the aperture adjustment and the shutter time adjustment of the camera predetermined by the intensity of illumination of the subject by the primary light source, the photographer may first adjust the outer scale member D relative to the scale member C to place the predetermined shutter time value on the scale 106 opposite the predetermined value on the aperture factor scale 108. Thus, in Fig. 13, 1/25 second on the shutter time factor scale 106 is positioned to register with f. 8 on the aperture factor scale 108.

The next step may be to adjust the rotary position of the scale member B relative to the scale member A to place the correct film sensitivity factor on the scale 112 opposite the value on the flash factor scale 114 that corresponds to the rating of the particular electronic flash that is to be used. Thus, in Fig. 15, the value 10 on the film sensitivity factor scale 112 is opposite the electronic flash rating 800.

The photographer may then use the range finder mechanism to position the scale members C and D relative to the scale members A and B in accord with the selected distance of the flash source from the subject in the same manner as described above. This third step places the contrast factor scale 110 on scale member B in correct relationship with the shutter time factor scale 106 on scale member D. If, for example, the final positions of the scale members are as shown in Fig. 13, it will be apparent that taking the picture with the shutter time adjustment of 1/25 second and the aperture adjustment f. 8 will result in a contrast ratio of approximately 3:1.

Here again the factor scales may be distributed in various ways among the four scale members. For example, the flash factor scale 114 may be on the scale member C instead of on the base scale member A, and the film sensitivity factor scale 112 may be on the base scale member A instead of on the scale member B.

My description in specific detail of selected specific embodiments of the invention will suggest to those skilled in the art various changes, substitutions and other departures from my disclosure that may be made within the spirit and scope of the appended claims.

I claim:

1. A device for determining illumination balance on photographic subjects illuminated by a primary light source and a secondary flash source, on the basis of the distance of the flash source from the subject together with factors including the effectiveness of the flash source, the sensitivity of the film, the size of the camera aperture, the camera shutter time, and the contrast ratio, said device having in combination: a range finder mechanism having a fixed element and an element movable relative to the fixed element to determine the distance to a photographic subject; a first scale member connected to said fixed range finder element in fixed relation thereto; a second scale member movable relative to said first scale member and operatively connected to said movable range finder element to move said movable range finder element in response to movement of said second scale member; a third scale member releasably connected with one of said first and second scale members for adjustment relative thereto to form a first cooperating pair of scale members; and a fourth scale member releasably connected with the other of said first and second scale members for adjustment relative thereto to form a second cooperating pair of scale members; said four scale members having cooperating index means including scales representing all of said factors; said index means comprising cooperating indices on the scale members of the first cooperating pair including at least one scale representing one of said factors, cooperating indices on said third and fourth scale members including at least one scale representing one of said factors, and cooperating indices on the scale members of the second cooperating pair defining scales representing others of said factors; said cooperating index means being interrelated whereby, with the members of one of the cooperating pairs adjusted relative to each other in accord with the cooperating indices thereon and with the members of the other cooperating pair adjusted relative to each other in accord with the cooperating indices thereon, the two pairs may be adjusted relative to each other by movement of said second scale member to effect distance-measuring adjustment of said movable range finder element, to thereby position the cooperating indices on the third and fourth scale members relative to each other in accord with the distance of the flash source from the subject and in accord with the particular values of said factors involved in a given illumination balance problem.

2. A device as set forth in claim 1 in which said first scale member is part of a base structure and the other three scale members comprise disks mounted on said base structure for rotation about a common axis.

3. A device as set forth in claim 2 in which said base structure includes the fixed parts of the range finder mechanism and serves as a handle for the device.

4. A device for determining illumination balance on photographic subjects illuminating by a primary light source and a secondary flash source, on the basis of the distance of the flash source from the subject together with factors including the effectiveness of the flash source, the sensitivity of the film, the size of the camera aperture, the camera shutter time, the contrast ratio, and the effectiveness of any screen used to subdue the light from the secondary flash source, said device having in combination: a range finder mechanism having a fixed element and an element movable relative to the fixed element to determine the distance to a photographic subject; a first scale member connected to said fixed range finder element in fixed relation thereto; a second scale member movable relative to said first scale member and operatively connected to said movable range finder element to move said movable range finder element in response to movement of said second scale member; a third scale member releasably connected with one of said first and second scale members for adjustment relative thereto to form a first cooperating pair of scale members; and a fourth scale member releasably connected with the other of said first and second scale members for adjustment relative thereto to form a second cooperating pair of scale members; the scale members of said first cooperating pair having cooperating scales thereon representing some of said factors; the scale members of said second cooperating pair having cooperating scales thereon representing others of said factors; and one of said third and fourth scale members having an index thereon cooperating with a scale on the other of said third and fourth members representing the remaining one of said factors; said cooperating scales and index being interrelated whereby, with the members of one of the pairs adjusted relative to each other in accord with the cooperating scales thereon and with the members of the other pair adjusted relative to each other in accord with the cooperating scales thereon, the two pairs may be adjusted relative to each other by movement of said second scale member to effect distance-measuring adjustment of said movable range finder element, to position said cooperating index and scale on the third and fourth scale members relative to each other in accord with the distance of the flash source from the subject and in accord with the particular values of said factors involved in a given illumination balance problem.

5. A device for determining illumination balance on photographic subjects illuminated by a primary steady light source and a secondary flash source, on the basis of factors including the distance of the flash source from the subject as a first factor, the effectiveness of the flash source as limited by the shutter time adjustment as a second factor, the sensitivity of the film combined with the shutter time adjustment as a third factor, the size of the camera aperture as a fourth factor, the contrast ratio as a fifth factor, and the effectiveness of any screen used to subdue the light from the secondary flash source as a sixth factor, said device having in combination: a range finder mechanism having a fixed element and an element movable relative thereto to determine the distance to a photographic subject; a first scale member connected to said fixed range finder element in fixed relation thereto; a second scale member movable relative to said first scale member and operatively connected to said movable range finder element to move said movable range finder element in response to movement of said second scale member relative to said first scale member in accord with said first factor; a third scale member releasably connected with one of said first and second scale members for adjustment relative thereto to form a first cooperating pair of scale members; and a fourth scale member releasably connected with the other of said first and second scale members for adjustment relative thereto to form a second cooperating pair of scale members; said second and third factors being represented by cooperating two-dimensional scales on the two scale members respectively of said second pair of members, said fourth and fifth factors being represented by cooperating scales on the respective scale members of said first pair of members, and said sixth factor being represented by a scale on one of said third and fourth scale members cooperating with an index on the other of said third and fourth members.

6. A device as set forth in claim 5 in which all of said scale members are positioned face to face with said second pair of members outermost and in which at least portions of said second pair of members are transparent to permit observation of indices therethrough.

7. A device as set forth in claim 6 in which the two scale members of said second outer pair are concentric rotatable disks and said cooperating two-dimensional scales are polar grid scales.

8. A device for determining illumination balance on photographic subjects illuminated by a primary light source and a secondary electronic flash source, on the basis of factors including the distance of the flash source from the subject as a first factor, the effectiveness of the flash source as a second factor, the sensitivity of the film as a third factor, the contrast ratio as a fourth factor, the size of the camera aperture as a fifth factor, and the shutter time adjustment as a sixth factor, said device having in combination: a range finder mechanism having a fixed element and an element movable relative thereto to determine the distance to a photographic subject; a first scale member connected to said fixed range finder element in fixed relation thereto; a second scale member movable relative to said first scale member and operatively connected to said movable range finder element to move said movable range finder element in response to movement of said second scale member relative to said first scale member in accord with said first factor; a third scale member releasably connected with one of said first and second scale members for adjustment relative thereto to form a first cooperating pair of scale members; and a fourth scale member releasably connected with the other of said first and second scale members for adjustment relative thereto to form a second cooperating pair of scale members; said second and third factors being represented by cooperating scales on the two scale members respectively of said first pair, said fourth factor being represented by a scale on said third scale member, and said fifth and sixth factors being represented by cooperating scales on the two scale members respectively of the second pair including a scale on the fourth scale member which also cooperates with the scale on the third scale member whereby with the members of one of the pairs adjusted relative to each other in accord with the cooperating scales thereon and the members of the other pair adjusted relative to each other in accord with the cooperating scales thereon, the two pairs may be adjusted relative to each other by movement of said second scale member to effect adjustment of said movable range finder element in accord with said first factor, to thereby position the cooperating scales on the third and fourth scale members in relation to each other in accord with the values of the factors involved in a given illumination balance problem.

9. A device as set forth in claim 8 in which said first scale member is part of a base structure and the other three scale members comprise disks mounted on said base structure for rotation about a common axis, and in which said base structure includes the fixed parts of the range finder mechanism and serves as a handle for the device.

10. A device for determining illumination balance on photographic subjects illuminated by a primary light source and a secondary flash source, on the basis of the distance of the flash source from the subject together with factors including the effectiveness of the flash source, the sensitivity of the film, the size of the camera aperture, the camera shutter time, the contrast ratio, and the effectiveness of any screen used to subdue the light from the secondary flash source, said device having in combination: a range finder mechanism having a fixed element and an element movable relative to the fixed element to determine the distance to a photographic subject; a first scale member connected to said fixed range finder element in fixed relation thereto; a second scale member movable relative to said first scale member and operatively connected to said movable range finder element to move said movable range finder element in response to movement of said second scale member; a third scale member releasably connected with one of said first and second scale members for adjustment relative thereto to form a first cooperating pair of scale members; and a fourth scale member releasably connected with the other of said first and second scale members for adjustment relative thereto to form a second cooperating pair of scale members; one of the scale members of the first cooperating pair having a scale thereon representing one of said factors and cooperating with an index on the other member of that pair; the scale members of the second cooperating pair having cooperating scales thereon representing others of said factors; and the third and fourth scale members having cooperating scales thereon representing the remaining ones of said factors; said cooperating scales and index being interrelated whereby, with the members of the first pair adjusted relative to each other in accord with the cooperating scale and index thereon and with the members of the second pair adjusted relative to each other in accord with the cooperating scales thereon, the two pairs may be adjusted relative to each other by movement of said second scale member to effect distance-measuring adjustment of said movable range finder element, to thereby position the cooperating scales on the third and fourth scale members relative to each other in accord with the distance of the flash source from the subject and in accord with the particular values of said factors involved in a given illumination balance problem.

11. A device for determining illumination balance on photographic subjects illuminated by a primary steady light source and a secondary flash source, on the basis of factors including the distance of the flash source from the subject as a first factor, the effectiveness of the flash source as limited by the shutter time adjustment as a second factor, the sensitivity of the film combined with the shutter time adjustment as a third factor, the size of the camera aperture as a fourth factor, the contrast ratio as a fifth factor, and the effectiveness of any screen used to subdue the light from the light source as a sixth factor, said device having in combination: a range finder mechanism having a fixed element and an element movable relative thereto to determine the distance to a photographic subject; a first scale member connected to said fixed range finder element in fixed relation thereto; a second scale member movable relative to said first scale member and operatively connected to said movable range finder element to move said movable range finder element in response to movement of said second scale member relative to said first scale member in accord with said first factor; a third scale member releasably connected with one of said first and second scale members for adjustment relative thereto to form a first cooperating pair of scale members; and a fourth scale member releasably connected with the other of said first and second scale members for adjustment relative thereto to form a second cooperating pair of scale members; said second and third factors being represented by cooperating two-dimensional scales on the two scale members respectively of the second pair of members, said fourth factor being represented by a scale on one of the scale members of the first pair cooperating with an index on the other member of that pair, and said fifth and sixth factors being represented by cooperating scales on the third and fourth scale members.

12. A device as set forth in claim 11 in which all of said scale members are positioned face to face with said second pair of members outermost and in which at least portions of said second pair of members are transparent to permit observation of scales therethrough.

13. A device as set forth in claim 12 in which the two scale members of said second outer pair are concentric rotatable disks and said cooperating two-dimensional scales are polar grid scales.

References Cited in the file of this patent

UNITED STATES PATENTS

| | | |
|---|---|---|
| 1,623,998 | Cooke | Apr. 12, 1927 |
| 2,060,613 | Dautzenberg | Nov. 10, 1936 |
| 2,213,749 | Strauss | Sept. 3, 1940 |
| 2,296,292 | Miller | Sept. 22, 1942 |
| 2,351,834 | Phillips | June 20, 1944 |